O. LINNEMANN.
DRAFTING DEVICE.
APPLICATION FILED MAY 1, 1912.
1,044,461.
Patented Nov. 12, 1912.
3 SHEETS—SHEET 1.
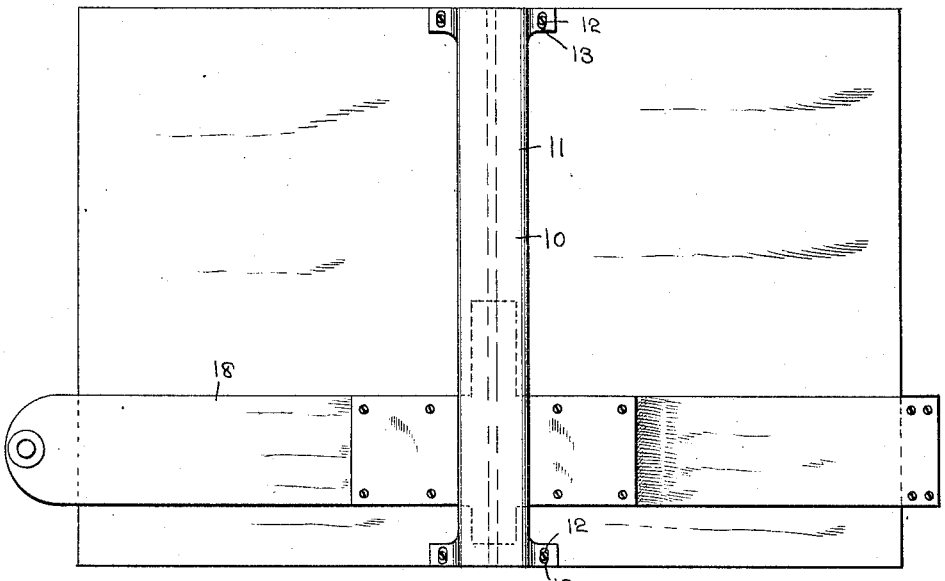
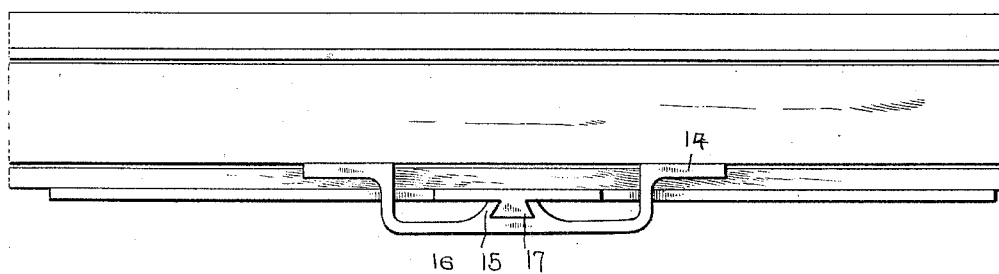
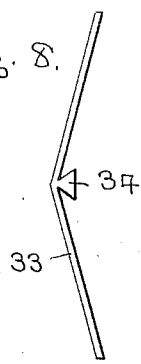
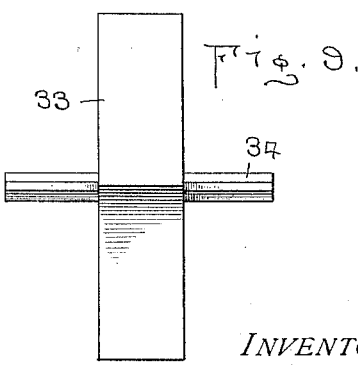
WITNESSES:
INVENTOR
O. Linnemann
BY
W. J. Fitzgerald Co.
Attorneys

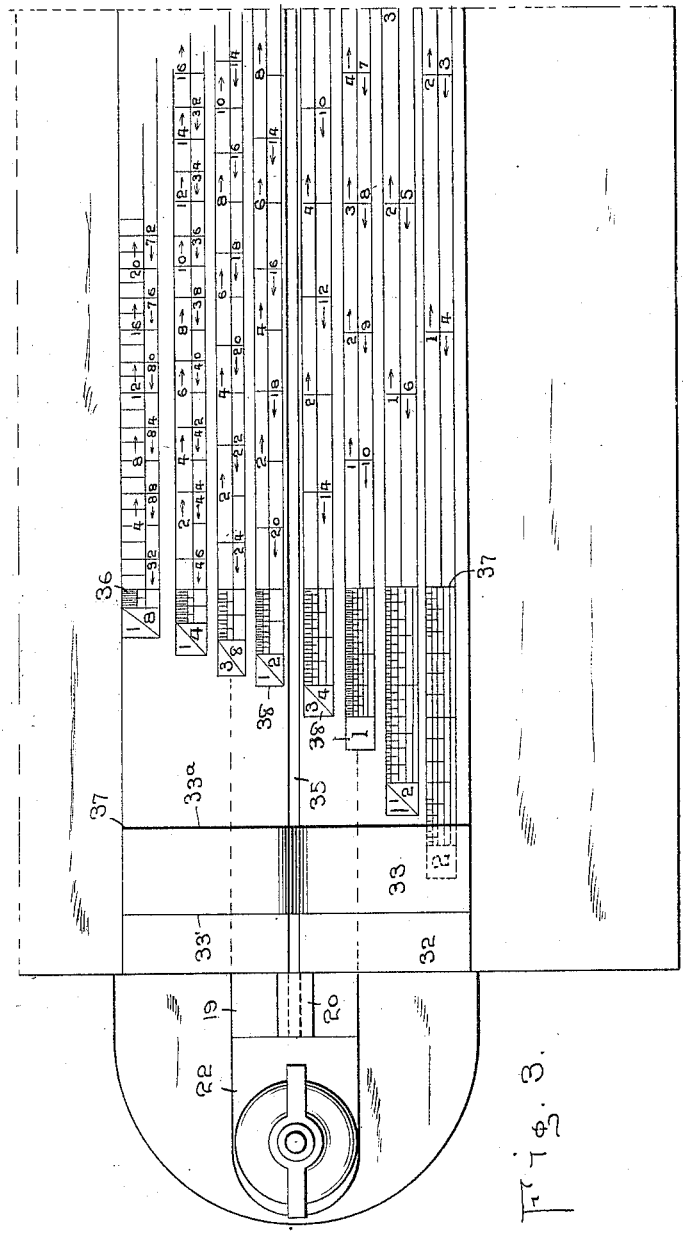

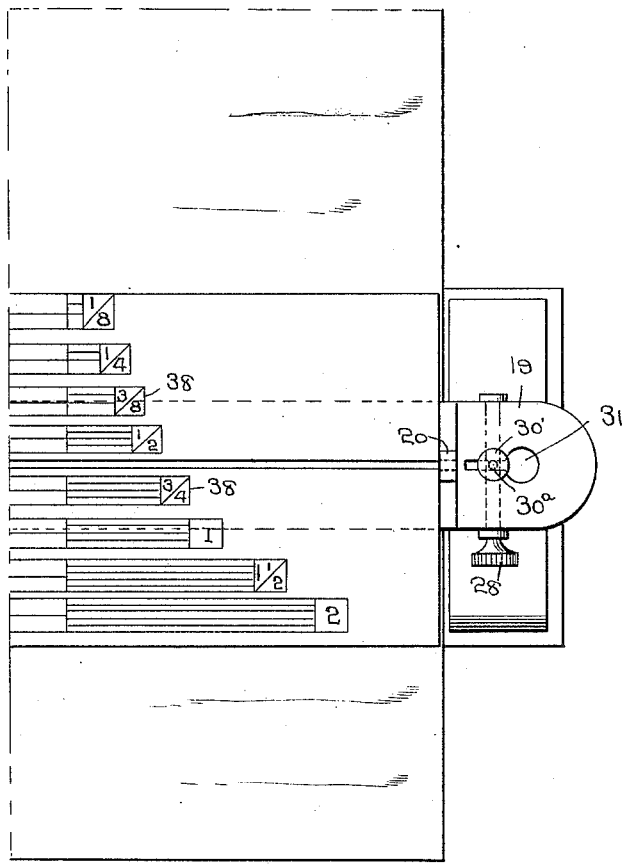
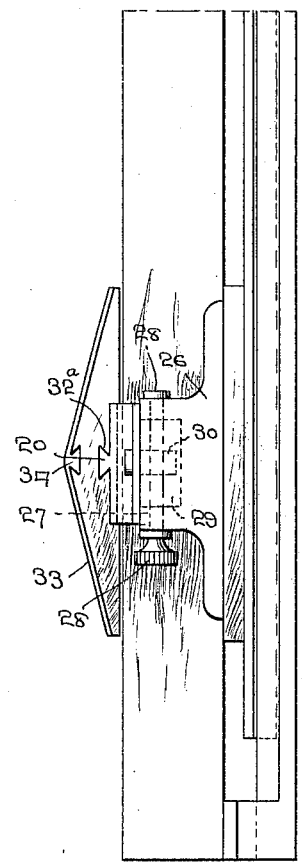
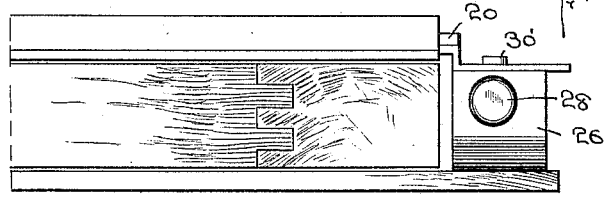
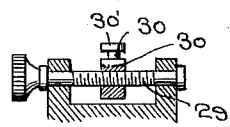

UNITED STATES PATENT OFFICE.

OTTO LINNEMANN, OF IRONWOOD, MICHIGAN.

DRAFTING DEVICE.

1,044,461.  Specification of Letters Patent.  Patented Nov. 12, 1912.

Application filed May 1, 1912. Serial No. 694,351.

*To all whom it may concern:*

Be it known that I, OTTO LINNEMANN, a citizen of the United States, residing at Ironwood, in the county of Gogebic and State of Michigan, have invented certain new and useful Improvements in Drafting Devices; and I do hereby declare the following to be a full, clear, and exact description of the invention, such as will enable others skilled in the art to which it appertains to make and use the same.

This invention relates to drafting devices, and it more particularly relates to a combination architect's scale, rule, and drawing board.

An object of the invention is to provide an improved device of this character, all the parts of which are connected and combined into one complete whole.

A further object of the invention is to provide a drawing board having guide means adjustably secured thereto, so as to provide for shrinkage of the board, said guide means being adapted to hold a rule or scale in numerous adjustable positions.

A further object of the invention is to provide an improved carrier for the rule or scale, and to provide adjusting means for the carrier, whereby perfect alinement of the rule may be assured.

A still further object is to provide a scale with graduations and with arrow heads, for indicating, at a glance, the direction in which the numerical value of the scale increases.

A still further object is to provide a scale with a lower dovetailed slot whereby it may be movably seated on the carrier, and with an upper dovetailed slot for carrying a slidable index member.

Other objects and advantages may be recited hereinafter and in the claims.

In the accompanying drawings which form a part of this application, Figure 1 is an under plan view of the complete device. Fig. 2 is an enlarged elevation view of the medial portion of the device. Fig. 3 is an enlarged plan view of a fragment of the board and of the scale. Fig. 4 is an elevation view of the structure shown in Fig. 3. Fig. 5 is a plan view similar to that in Fig. 3, showing the opposite end of the rule, scale member and its adjusting mechanism. Fig. 6 is a side elevation view of the structure shown in Fig. 5. Fig. 7 is an end elevation view of the structure shown in Fig. 5. Figs. 8 and 9 are an elevation and a top plan view respectively, of the slidable gage or index member detached, and, Fig. 10 is a fragmental detail view illustrating the construction of the adjusting mechanism.

Referring to these drawings, in which similar reference characters correspond with similar parts throughout the several views, the board 10 has a slotted guide bar 11 secured thereto by means of screws 12, said screws being seated in elongated apertures 13, thereby providing for shrinkage of the board 10, in an obvious manner. The guide bar 11 is provided with U-shaped ends, as more clearly shown in Fig. 2, said U-shaped ends being provided with lateral extensions 14, having the apertures 13 therein. The bar 11 is also provided with inwardly and upwardly inclined flanges 15, having a dovetailed groove therebetween. A guide plate 16 is provided with a dovetailed rib 17, which fits in the dovetailed groove between the flanges 15, and is adapted to be slid therein, throughout the width of the board 10. A lower carrier beam 18 is secured to the guide plate, by screws or other proper means, and has an upper carrier plate 19 movably secured thereto at its end portions, and provided with a dovetailed rib 20, one of said end portions comprising a downturned or vertical section 21 and an apertured horizontal section 22, through the aperture of which extends a screw-threaded clamping member 23, which comprises a part of a clamping mechanism for holding one end of the carrier plate and of the carrier beam together. The other elements of the clamping mechanism comprise a washer or disk 24, loosely seated upon the end section 22, around the shank of the member 23, and a winged nut 25, engaging the threads of the member 23 and adapted to co-act therewith for clamping the ends of said carrier plate and carrier beam together, in an obvious manner.

Upon the end of the carrier beam, opposite to the section 22, is seated a block 26, which is apertured at 27 for the reception of an adjusting screw-threaded member 28, and provided with an aperture 29 in communication with the aperture 27. An apertured and screw-threaded stud 30 is engaged by the threads of the screw 28 and adapted to be moved thereby in the aperture 29, by turning the knurled screw-head or thumb piece of said screw 28. The stud 30 comprises the apertured body portion, a head 30' and a neck 30ᵃ, connecting the head and body portion. The adjacent end of the carrier plate has a key-hole aperture 31 therethrough, comprising a substantially circular portion through which the head 30' may be passed, and a slotted portion into which the neck 30ᵃ is slidably seated. It will be seen, therefore, that when the clamping mechanism is loosened by means of the nut 25, the plate 19 may be oscillated slightly by means of the screw-threaded member 28 and the stud 30. By this means, the carrier plate will carry the scaled member or rule 32 into adjusted position, so that exact parallel relation, with regard to the top and bottom edges of the drawing board, and an exact perpendicular relation with regard to the lateral edges of the board, may be obtained.

An index member 33, consisting of two plates integrally united with each other and with a dovetailed rib 34, is provided for engagement with a dovetailed groove 35, extending centrally throughout the length of the scale member or rule 32, the rib 34 being adapted to be slid in the groove 35.

The graduations on the rule, may be of any preferred denomination or character and of any reasonable number; but in the present embodiment of my invention, I have chosen the graduations which are found most applicable in architectural drawing. One of the principal characteristics of this member 32, consists in the fact that a series of parallel and differently graduated scales are arranged on a common transverse line, having whole denominations on one side thereof and having fractional denominations on the other side thereof. For instance, in Fig. 3, considering the third scale, or one-inch-scale from the bottom of the member 32, marked 1, it will be seen that to the right of said 1, and of the inch which is divided into forty-eighths, the dividing line of said scale is in alinement with a similar dividing line of each scale of the series, these coinciding dividing lines being alined between the numerals 36 and 37. It will be seen that to the right of this common dividing line, the divisions are not fractional, but are undivided throughout the respective distances indicated by the terminal index characters 38, at the ends of each scale. Still considering the one inch scale, it will be noted that each division of one inch is provided with an arrow which points in the direction of the higher numbers of the scale. It will also be seen that the numbers in each scale are arranged in increasing and decreasing progression, each scale being divided by a longitudinal central line, the arrows above said line pointing to the right, and those below said line pointing to the left, thereby indicating that the numbers above the line increase in value toward the right, while those below the line increase in value toward the left. Therefore, each scale may be described as arranged in increasing and decreasing progression, while the oppositely disposed arrows thereof may be said to indicate increasing and decreasing progression of the scale.

Obviously, it is quite difficult to properly locate a draftsman's triangle or the like exactly opposite to any element of the rule, without the intermediate scales of the rule, without the use of the index member 33, but by use of this member, as shown in Fig. 3, the lateral edge 33ᵃ, when coinciding with any element of a scale, indicates the position of said element relative to the edge of the rule 32, as shown at 37, so that the line comprising said element is virtually temporarily extended across from one edge of the rule to the opposite edge thereof. It is obvious that, similarly, the line comprising any scale element, intermediate or lateral, may be extended to either edge of the rule through the instrumentality of the index 33, either by the edge 33' thereof or by the edge 33ᵃ.

It is obvious that by seating the rib 17 between the two flanges 15, said rib being snugly fitted therebetween, the same may be moved without unnecessary effort; at the same time being held in adjusted position, by a slight spring action of the flanges 15, effecting frictional engagement between the ribs 17 and flanges 15. The rule member is also held in adjusted position upon the carrier plate by frictional engagement of the rib 20, of the latter, with the dovetailed groove 32ᵃ, of the former, and when desirable, the said rule member may be removed, and another of similar construction but differently graduated, not shown, may be substituted therefor.

It will be seen that I have provided a device of this character which is fully capable of attaining the foregoing objects, and in a thoroughly practical and efficient manner.

I do not limit my invention to the exact details of construction, combination and arrangement of parts as illustrated and described in the foregoing, but my invention may only be limited by a reasonable interpretation of the following claims.

I claim:

1. In a combination drawing board, rule and drafting appliance, a guide bar secured to said drawing board, a guide plate movably secured to the guide bar and carrying a carrier beam, a carrier plate pivotally and adjustably secured to the carrier beam and a rule secured on the carrier plate.

2. In a drafting device, a board, a guide bar secured to the board, a carrier beam connected with the guide bar and adapted to be moved laterally, a carrier plate seated on the carrier beam, and a rule secured to the carrier plate and adapted to be moved longitudinally thereof.

3. In a drafting appliance, a board, a carrier beam adapted to be moved laterally under the board, a carrier plate seated on the carrier beam and extending over the board, and a rule carried by the carrier plate.

4. In a drafting appliance, a board, a flanged guide bar having a dovetailed aperture between the flanges thereof, a carrier beam having a dovetailed rib frictionally seated between the flanges and adapted to be slid in said groove, said guide bar being secured to the under side of the board, said carrier beam being disposed between the board and the guide bar and extending beyond the two opposite edges of the board, a carrier plate secured to the extended ends of the carrier beam, and a rule secured to the carrier plate.

5. In a drafting appliance, a board, a guide plate having a dovetailed rib thereon and associated with guide means secured to the board, and a rule having a dovetailed groove longitudinally disposed therein and adapted to removably engage the rib of the guide plate, for the purpose specified.

In testimony whereof I have signed my name to this specification in the presence of two subscribing witnesses.

OTTO LINNEMANN.

Witnesses:
 W. T. LENNON,
 H. A. BLOESING.

Copies of this patent may be obtained for five cents each, by addressing the "Commissioner of Patents, Washington, D. C."